US010795828B2

(12) United States Patent
Yeap et al.

(10) Patent No.: US 10,795,828 B2
(45) Date of Patent: Oct. 6, 2020

(54) DATA VALIDITY TRACKING IN A NON-VOLATILE MEMORY

(71) Applicant: Micron Technology, Inc., Boise, ID (US)

(72) Inventors: Boon Leong Yeap, Broomfield, CA (US); Karl D. Schuh, Santa Cruz, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 173 days.

(21) Appl. No.: 16/101,288

(22) Filed: Aug. 10, 2018

(65) Prior Publication Data

US 2020/0050556 A1    Feb. 13, 2020

(51) Int. Cl.
| | | |
|---|---|---|
| G06F 12/14 | (2006.01) | |
| G06F 3/06 | (2006.01) | |
| G06F 12/02 | (2006.01) | |
| G06F 16/901 | (2019.01) | |

(52) U.S. Cl.
CPC ........ *G06F 12/1416* (2013.01); *G06F 3/0608* (2013.01); *G06F 3/0644* (2013.01); *G06F 3/0685* (2013.01); *G06F 12/0292* (2013.01); *G06F 16/9017* (2019.01)

(58) Field of Classification Search
CPC ............. G06F 12/1416; G06F 12/0253; G06F 12/0292; G06F 12/10; G06F 12/1009; G06F 12/1018; G06F 12/0815; G06F 12/1027; G06F 12/1036; G06F 12/109; G06F 3/0608; G06F 3/0644; G06F 3/0685; G06F 3/064; G06F 3/0638; G06F 16/9017
See application file for complete search history.

(56) References Cited

U.S. PATENT DOCUMENTS

| | | | |
|---|---|---|---|
| 8,996,796 B1* | 3/2015 | Karamcheti | G06F 12/121 711/103 |
| 9,720,835 B1* | 8/2017 | Shilane | G06F 12/0833 |
| 2006/0053254 A1 | 3/2006 | Van Eijndhoven | |
| 2012/0054746 A1 | 3/2012 | Vaghani et al. | |
| 2013/0191565 A1* | 7/2013 | Tal | G06F 3/061 710/74 |
| 2013/0227236 A1 | 8/2013 | Flynn et al. | |
| 2014/0189206 A1 | 7/2014 | Sinclair et al. | |

(Continued)

OTHER PUBLICATIONS

International Search Report and Written Opinion, PCT App. No. PCT/US2019/043628, dated Oct. 31, 2019, 9 pages.

*Primary Examiner* — Michael Krofcheck
(74) *Attorney, Agent, or Firm* — Nicholson De Vos Webster & Elliot LLP (57) ABSTRACT

A computer device reads an indicator from a configuration file that identifies a granularity of units of data at which to track validity. The granularity is one of a plurality of granularities ranging from one unit of data to many units of data. The computer device generates a machine-readable file configured to cause a processing device of a memory system to track validity at the identified granularity using a plurality of data validity counters with each data validity counter in the plurality of data validity counters tracking validity of a group of units of data at the identified granularity. The computer device transfers the machine-readable file to a memory of the memory system.

20 Claims, 6 Drawing Sheets

(56) References Cited

U.S. PATENT DOCUMENTS

| | | | |
|---|---|---|---|
| 2015/0347026 A1* | 12/2015 | Thomas | G06F 3/0611 |
| | | | 711/103 |
| 2017/0039203 A1* | 2/2017 | Xu | G06F 12/00 |
| 2017/0300249 A1 | 10/2017 | Geml et al. | |
| 2018/0004650 A1* | 1/2018 | Battaje | G06F 12/0246 |

* cited by examiner

DATA VALIDITY TRACKING IN A
NON-VOLATILE MEMORY

TECHNICAL FIELD

The present disclosure generally relates to non-volatile memory, and more specifically, relates to tracking data validity.

BACKGROUND ART

A memory subsystem can be a storage system, such as a solid-state drive (SSD), and can include one or more memory components that store data. The memory components can be, for example, non-volatile memory components and volatile memory components. In general, a host system can utilize a memory subsystem to store data at the memory components and to retrieve data from the memory components. Programmable processing devices control the operation of the memory subsystem. Changing the programming of these processing devices can change the operation of the memory subsystem.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to tracking data validity tracking in a non-volatile memory subsystem. A memory subsystem is also hereinafter referred to as a "memory device." An example of a memory subsystem is a storage system, such as a solid-state drive (SSD). In some embodiments, the memory subsystem is a hybrid memory/storage subsystem. In general, a host system can utilize a memory subsystem that includes one or more memory components. The host system can provide data to be stored at the memory subsystem and can request data to be retrieved from the memory subsystem.

To facilitate the host system's ability to store and retrieve data from the memory subsystem, the memory subsystem includes one or more processing devices that perform operations such as encoding and decoding, error recovery, compression, address translation, data erasure, and the like Changing the programming of these one or more processing devices changes the operation of the memory subsystem.

Many of the operations performed by the one or more processing devices have both a computational cost (that can add delays to the time required by the host system to read or write to memory) and a memory cost (that can reserve some portion of memory thereby reducing the amount available to the host system). Data reclamation is one such operation. Sometimes referred to as "garbage collection" or "folding," data reclamation is a process widely deployed in flash-memory subsystems to reclaim unused portions of memory. Data reclamation addresses the need to erase flash-memory in blocks before writing new data to it. When data stored in a memory subsystem is no longer needed (e.g., because the host system "deleted" or rewrote it), the data is not immediately deleted but rather flagged as no longer needed (e.g., "stale"). Because the stale data may be stored with other non-stale data in a portion of memory that is erased as a block, a data reclamation process occasionally moves the non-stale data to another portion of memory so that the block of memory can be erased and made available for new data. Thus, the data reclamation process preserves non-stale or "valid" data while freeing the space associated with the stale or "invalid" data.

Depending on the available computational and memory resources for the processing device(s) included with the memory subsystem, the programming of the memory subsystem can vary because the computational and memory cost associated with one data reclamation approach may be possible with a memory subsystem designed for one workload but not with another memory subsystem designed for another workload. For example, a memory subsystem targeted toward enterprise-level storage applications may have a larger computational and memory budget to support memory subsystem operations offering higher performance due to an increased resource budget relative to a consumer-level memory subsystem. Thus, the operation (and thus programming) of memory subsystems varies from one memory subsystem design to another. As a result, a memory subsystem manufacturer develops many different code versions for each variation or version within its product line. Furthermore, the memory subsystem manufacturer maintains each code version to integrate updates, fixes, etc., complicating the maintenance of the code base for the different memory subsystems.

Aspects of the present disclosure address the above and other deficiencies by automatically and dynamically preparing the firmware and/or software that controls data reclamation operations in a memory-subsystem. In this manner, different memory subsystems having different computational and memory budgets do not require the development and maintenance of different code bases for each memory subsystem. Additionally, aspects of the present disclosure address the above and other deficiencies through various implementations of the data reclamation process that can maintain computational cost of the data reclamation process while reducing the associated memory cost. The reduced memory cost can include reducing the footprint of a validity table that informs the data reclamation process which data is stale/not-stale and the footprint of address translation tables that are used during operation to translate "logical" addresses associated with read or write commands from a host system to "physical" addresses corresponding to a location or locations within the memory subsystem where the data is actually stored.

Figure 1:
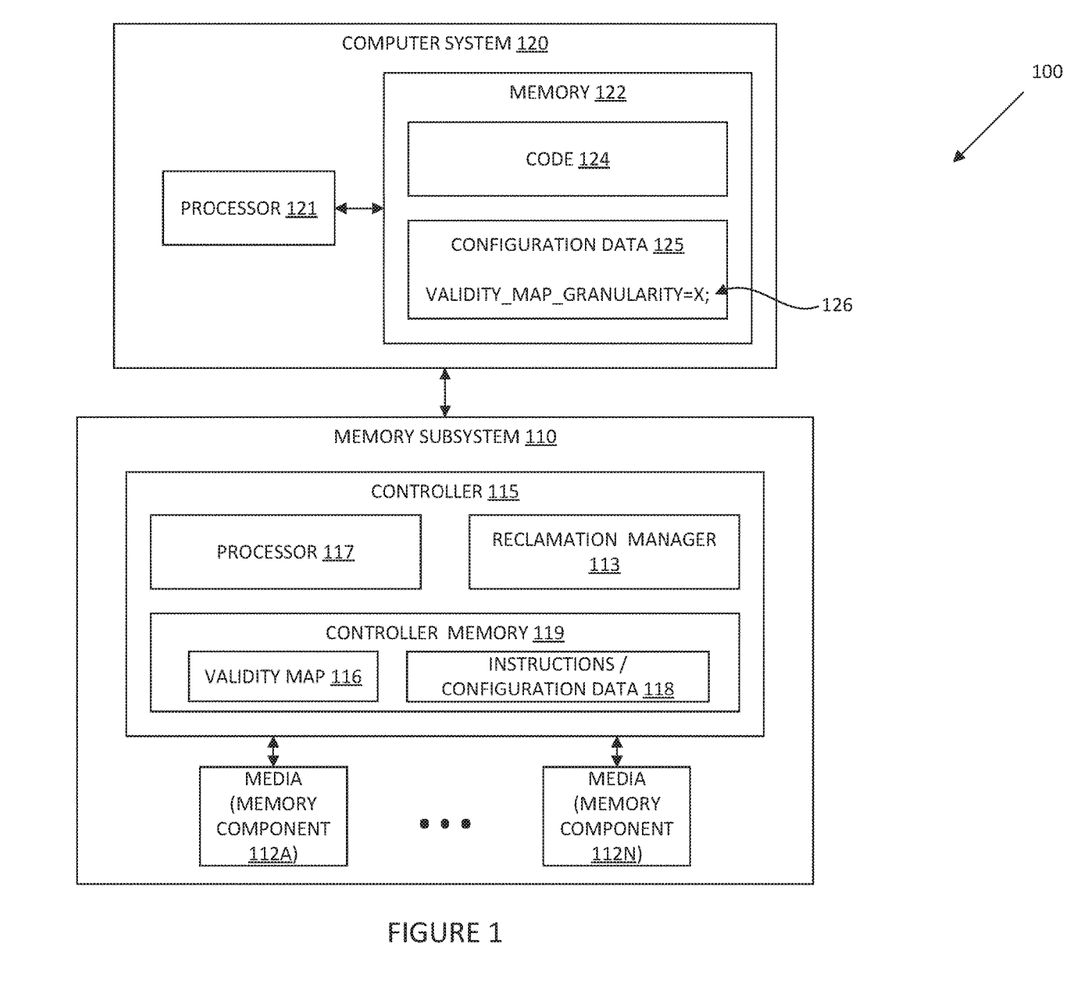
FIG. 1 illustrates an example computing environment that includes a memory subsystem in accordance with some embodiments of the present disclosure.

FIG. 1 illustrates an example computing environment 100 that includes a memory subsystem 110 in accordance with some embodiments of the present disclosure. The memory subsystem 110 can include media, such as memory components 112A to 112N. The memory components 112A to 112N can be volatile memory components, non-volatile memory components, or a combination of such. In some embodiments, the memory subsystem is a storage system. An example of a storage system is a SSD. In some embodiments, the memory subsystem 110 is a hybrid memory/storage subsystem. In some embodiments, the computing environment 100 includes a computer system 120 that can transfer new or updated programming to the memory subsystem 110. For example, the computer system 120 can store programming information to the controller memory 119. In other embodiments, the computer system 120 uses the memory subsystem 110 for data storage and retrieval operations from the memory components 112A to 112N. For example, the computer system 120 can write data to the memory subsystem 110 and read data from the memory subsystem 110.

The computer system 120 can be a computing device such as a desktop computer, laptop computer, memory programming device, network server, mobile device, or such computing device that includes a processing device 121 and a memory 122. The computer system 120 can include or be coupled to the memory subsystem 110 so that the computer system 120 can read data from or write data to the memory subsystem 110. The computer system 120 can be coupled to the memory subsystem 110 via a physical interface. In some embodiments, the computer system 120 is coupled to a component of the memory subsystem 110, such as the controller memory 119, either prior to or during manufacture of the memory subsystem. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical interface include, but are not limited to, a serial advanced technology attachment (SATA) interface, a peripheral component interconnect express (PCIe) interface, universal serial bus (USB) interface, Fibre Channel, Serial Attached SCSI (SAS), JTAG IEEE 1149, etc. The physical interface can be used to transmit data between the computer system 120 and the memory subsystem 110. The computer system 120 can further utilize an NVM Express (NVMe) interface to access the memory components 112A to 112N when the memory subsystem 110 is coupled with the computer system 120 by the PCIe interface. The physical interface can provide an interface for passing control, address, data, and other signals between the memory subsystem 110 and the computer system 120.

In the illustrated embodiment of computer system 120, memory 122 includes code 124 and configuration data 125. For example, the code 124 can be human-readable software (e.g., written in C, C++, etc.) and/or firmware (e.g., written in a hardware description language, etc.) and other files (e.g., libraries, etc.) that were developed to support multiple different memory subsystems. The configuration data 125 includes a configuration parameter 126 to adjust the granularity at which data validity is tracked, as described below. A compiler or other development tool executed in the computer system 120 (not shown) converts the human-readable software/firmware, using the configuration data 125, into one or more machine-readable files including instructions or configuration data to program and/or configure the controller 115 to perform the functions described herein. In other embodiments, the computer system 120 uses, but does not program, the memory subsystem 110 (e.g., the memory 122 does not include the code 124 and configuration data 125).

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the computer system 120. Although non-volatile memory components such as NAND type flash memory are described, the memory components 112A to 112N can be based on any other type of memory such as a volatile memory. In some embodiments, the memory components 112A to 112N can be, but are not limited to, random-access memory (RAM), read-only memory (ROM), dynamic RAM (DRAM), synchronous DRAM (SDRAM), phase change memory (PCM), magneto RAM (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory subsystem controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in controller memory 119. In the illustrated example, the controller memory 119 of the controller 115 includes an embedded memory configured to store instructions for performing various processes, operations, logic flows, and routines that control operation of the memory subsystem 110, including handling communications between the memory subsystem 110 and the computer system 120. In some embodiments, the computer system 120 stores these instructions in the controller memory 119. In some embodiments, the controller memory 119 can include memory registers storing memory pointers, fetched data, etc. The controller memory 119 can also include read-only memory (ROM) for storing code (e.g., microcode) received from the computer system 120. In some embodiments, the instructions/configuration data 118 includes data from the machine-readable files generated by the compiler or other development tool by the computer system 120. The instructions/configuration data 118 can be executed by or can configure components of the memory subsystem 110, such as the processor 117 or the reclamation manager 113. While the example memory subsystem 110 in FIG. 1 has been illustrated as including the controller 115, in another embodiment of the present disclosure, a memory subsystem 110 may not include a controller 115, and may instead rely upon external control (e.g., provided by an external host, or by a processor or controller separate from the memory subsystem).

In some embodiments, the controller memory 119 can also include DRAM and/or static RAM (SRAM) to store data for the various processes, operations, logic flows, and routines performed by the controller 115. One such type of data is a validity map 116. As described below, the validity map 116 includes data used during the data reclamation process to identify valid and invalid data.

In general, the controller 115 can receive commands or operations from the computer system 120 and can convert the commands or operations into instructions or appropriate commands to achieve the desired access to the memory components 112A to 112N. In some embodiments, the controller 115 includes command support to allow the computer system 120 to program the controller memory 119. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. In some embodiments, the controller 115 maintains one or more address lookup tables in a portion of the media (e.g., memory components 112A to 112N). In some embodiments, the controller 115 may fetch and cache portions of the table(s) in the controller memory 119. Using a logical-to-physical address lookup table, the controller 115 can obtain a physical address of data given its logical address (e.g., from the computer system 120). Depending on the level of granularity at which data validity is tracked, the controller 115 may use a physical-to-logical address lookup table to lookup a logical address for a particular physical address (e.g., during data reclamation, as described herein). In some embodiments, the physical-to-logical address lookup table may not be necessary if the granularity at which the controller 115 tracks data validity is sufficiently fine, as described herein.

The controller 115 can further include interface circuitry to communicate with the computer system 120 via the physical interface. The interface circuitry can convert the commands received from the computer system 120 into command instructions to access the memory components 112A to 112N as well as convert responses associated with the memory components 112A to 112N into information for the computer system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the controller 115 and decode the address to access the memory components 112A to 112N.

The memory subsystem 110 includes a reclamation manager component 113 that can be used to reclaim portions of media based on the validity map 116. In some embodiments, the controller 115 includes at least a portion of the reclamation manager component 113. For example, the controller 115 can include a processor 117 (processing device) configured to execute instructions stored in controller memory 119 for performing the operations described herein. In some embodiments, the reclamation manager component 113 is part of the computer system 120, an application, or an operating system.

The reclamation manager component 113 can identify a portion of memory to be reclaimed, determine which data within the portion of memory is used versus which data is unused, move the used data to another portion of memory, and erase the portion of memory being reclaimed. Further details with regards to the operations of the reclamation manager component 113 are described below.

A variety of data organization schemes can be employed to aid in the management of the media. In one embodiment, a translation unit (TU) is the smallest granularity tracked across the address translation layer (from logical to physical addresses and vice versa). A TU is comprised of metadata and user data. In some embodiments, the size of the user data in a TU is an integer multiple of the logical block addressing sector size. For example, if each address in the logical address space identifies a 512-kilobyte sector, the size of the user data may be eight times the sector size, or 4,096-kilobytes. The metadata in a TU includes logical address information for the user data. Thus, when the computer system 120 writes user data to the memory subsystem at a logical address, the controller stores a TU, including the user data and metadata identifying the logical address, at a particular physical location within the media.

TUs may be grouped to form higher logical groups at coarser levels of granularity. For example, four TUs can be grouped into a page. Four pages can be grouped to form a multiplane. Multiplanes may reside on a single memory component 112 or span multiple memory components 112A-112N to form a page stripe. Multiple page stripes can be grouped to form a block stripe. Other embodiments may include different group sizes, different numbers of granularity levels, and different layouts.

The controller 115 can issue read or write operations at the varying levels of granularity, subject to varying levels of performance For example, some embodiments may exhibit increased latency with each increase in granularity (e.g., a TU read operation is faster than a page read operation; a page read operation is faster than a multiplane read operation, etc.). Other embodiments may have an operation latency that is comparable for multiple levels of granularity. For example, in embodiments where a TU, page, and multiplane are resident within a single memory component 112, the read latency associated with those logical groups may be comparable (e.g., 100 microseconds). If a block stripe spans multiple memory components 112A-112N, the read latency associated with the block stripe may scale upwards as the number of memory components increases (e.g., 100N microseconds, where N is the number of memory components 112 that the block stripe spans).

FIGS. 2A through 2D illustrates exemplary data validity maps that track data validity at various granularities of units of data in accordance with some embodiments of the present disclosure. Depending on the configuration data 125, the controller 115 tracks data validity at different levels of granularity. Exemplary validity maps 116 in FIGS. 2A through 2D are based on the four levels of granularity described above (TU, page, multiplane, block stripe) and assume a block stripe size that includes 64 TUs at four TUs per page, four pages per multiplane, and four multiplanes per block stripe.

Figure 2A:
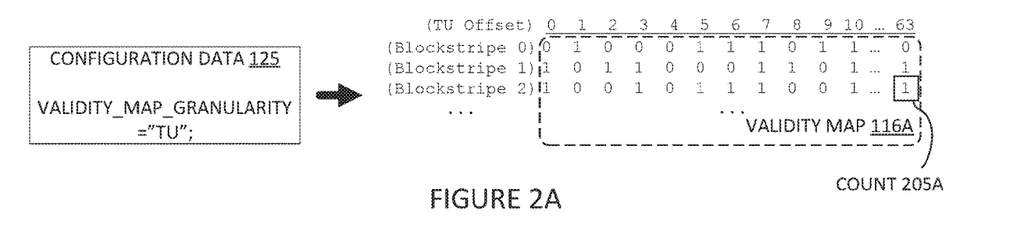
FIGS. 2A through 2D illustrate exemplary data validity maps that track data validity at various granularities of units of data in accordance with some embodiments of the present disclosure.

In FIG. 2A, the configuration data 125 specifies that the validity map tracks data at the TU level of data granularity. Validity map 116A illustrates a validity map at the TU level of granularity. The validity map 116A comprises a counter for each TU of each block stripe. The counter represents a number of TUs having valid data. Because the granularity in this example is one TU, a single bit counter 205A represents the validity of the TU (e.g., a '1' is valid, a '0' means invalid). Based on the 64-TU size block stripe, the total footprint for validity map 116A in controller memory 119 is thus 64 times the number of block stripes that fit within the media (64 bits×number of block stripes).

Figure 2B:
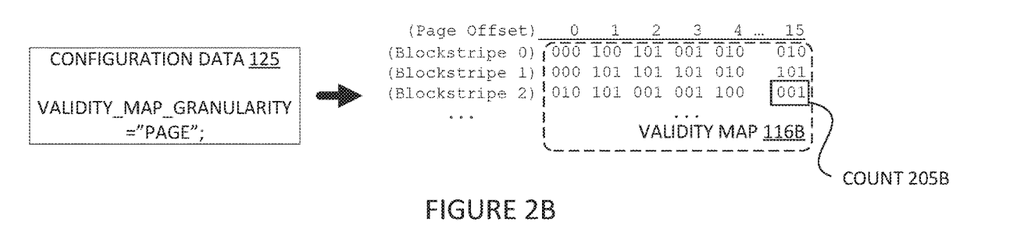

In FIG. 2B, the configuration data 125 specifies that the validity map tracks data at the page level of data granularity. Validity map 116B illustrates a validity map at the page level of granularity. The validity map 116B comprises a counter for each page of each block stripe. The counter represents the number of TUs within the page having valid data. Because the granularity in this example is one page (and assuming there are four TUs per page), the validity map 116B stores a three-bit counter 205B per page to represent five possible states (e.g., no valid TUs, one valid TU, two valid TUs, three valid TUs, or four valid TUs). Based on the 64-TU size block stripe, the total footprint for validity map 116B in controller memory 119 is thus 48 times the number of block stripes that fit within the media (3 bits/page×16 pages×number of block stripes).

Figure 2C:
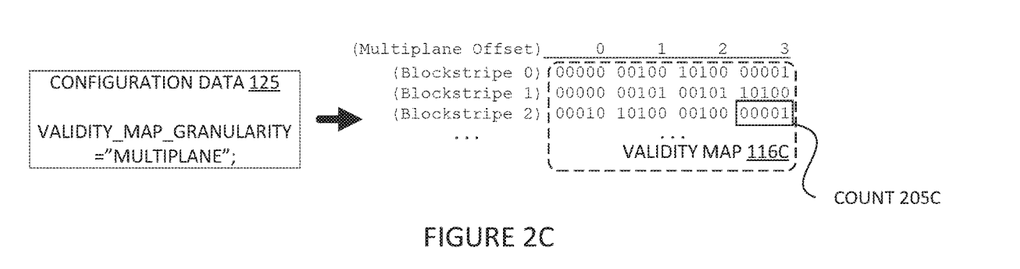

In FIG. 2C, the configuration data 125 specifies that the validity map tracks data at the multiplane level of data granularity. Validity map 116C illustrates a validity map at the multiplane level of granularity. The validity map 116C comprises a counter for each multiplane of each block stripe. The counter represents the number of TUs within the multiplane having valid data. Because the granularity in this example is one multiplane (and assuming there are sixteen TUs per multiplane), the validity map 116C stores a five-bit counter 205C per multiplane to represent seventeen possible states (e.g., no valid TUs, one valid TU, two valid TUs, up through sixteen valid TUs). Based on the 64-TU size block stripe, the total footprint for validity map 116B in controller memory 119 is thus 20 times the number of block stripes that fit within the media (5 bits/multiplane×4 multiplanes×number of block stripes).

Figure 2D:
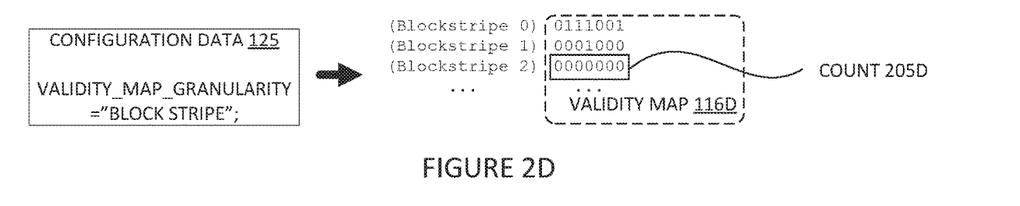

In FIG. 2D, the configuration data 125 specifies that the validity map tracks data at the block stripe level of data granularity. Validity map 116D illustrates a validity map at the block stripe level of granularity. The validity map 116D comprises a count for each block stripe. The count represents the number of TUs within the block stripe having valid data. Because the granularity in this example is one block stripe (and assuming there are 64 TUs per block stripe), the validity map 116D stores a seven-bit count 205D per block stripe to represent sixty-five possible states (e.g., no valid TUs, one valid TU, two valid TUs, up through sixty-four valid TUs). Based on the 64-TU size block stripe, the total footprint for validity map 116B in controller memory 119 is thus 7 times the number of block stripes that fit within the media (7 bits/block stripe×number of block stripes).

As the above description of validity maps 116A-D illustrates, the coarser the granularity at which data validity is tracked, the lower the memory footprint of the validity map within controller memory 119. Thus, controller 115 provisions an amount of space in memory for the validity map 116 based on the configuration data 125.

Figure 3:
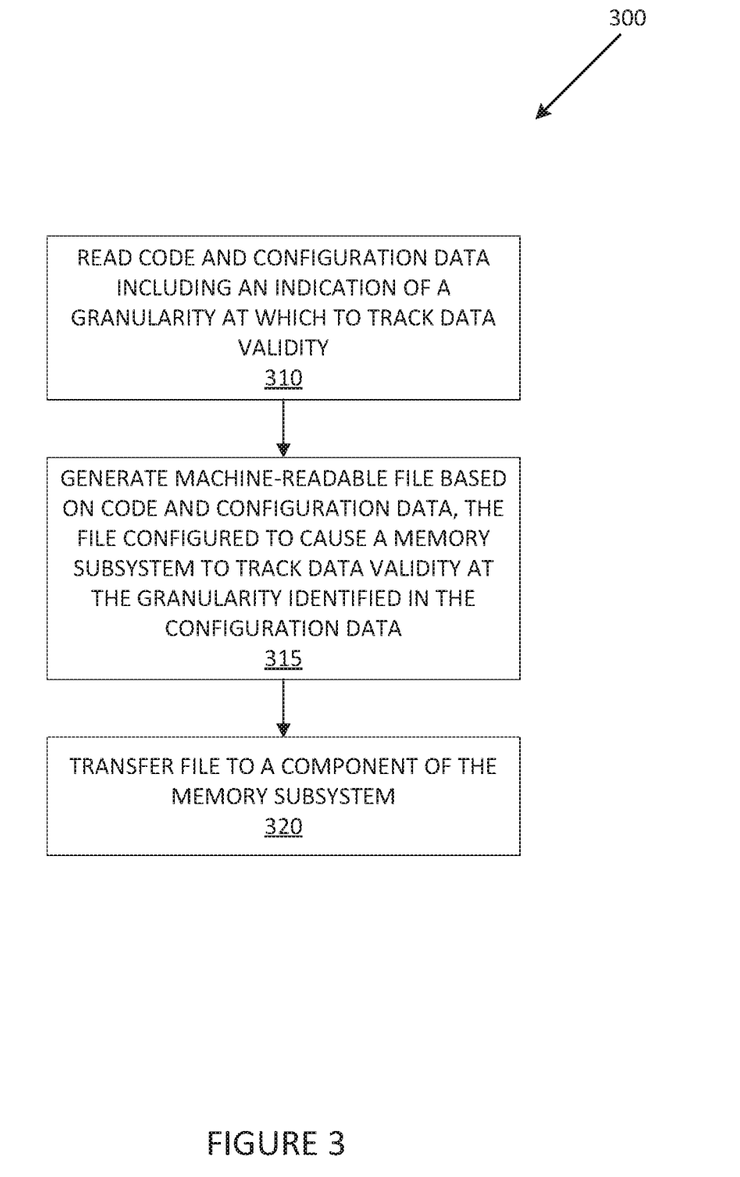
FIG. 3 is a flow diagram of an example method to generate a machine-readable file for tracking data validity at various granularities in accordance with some embodiments of the present disclosure.

FIG. 3 is a flow diagram of an example method to generate a machine-readable file for tracking data validity at various granularities in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 'Y00 is performed by the processor 121 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In some embodiments, the process begins in response to a command from a user such as a developer. At block 310, the processing device reads one or more files containing code (e.g., code 124) used to generate the firmware and/or software that controls a memory subsystem. These files are part of a single code base that supports multiple different memory subsystems.

At block 310, the processing device further reads configuration data such as configuration data 125. The configuration data may be specific to a single memory subsystem or associated with a proper subset of the memory subsystems supported by the code base. The processing device obtains an indicator that identifies a granularity of units of data at which to track validity. The indicator may designate one the various units of data, such as the TU, page, multiplane, or block stripe described herein, or units based on some other data organization scheme. In some embodiments, the indicator is dynamically calculated based on configuration data that specifies the total amount of memory of which validity is tracked relative to the amount of available space for the validity map. For example, the configuration data could indicate that the media contains space for 1,000 validity-tracked block stripes and that the validity map cannot exceed 10 kilobits of memory. Based on the data organization described herein and the validity maps described with reference to FIGS. 2A through 2B, the processing device determines validity is tracked at the block stripe level because the associated 7:1 ratio of the validity map size (7,000 bits) to block stripe count (1,000) fits within 10 kilobits, while the 20:1 ratio for a validity map tracked at the multiplane-level granularity would require more memory than is available.

One or more of the files read at block 310 may be stored in a version-controlled storage repository maintained by the manufacturer or code developer.

At block 315, the processing device generates a machine-readable file configured to cause a processing device associated with the memory subsystem to track validity at the identified granularity using a plurality of data validity counters, each data validity counter in the plurality of data validity counters tracking validity of a group of units of data at the identified granularity. The file may be firmware and/or software in a binary file, an executable file, or some other file readable by the controller 115. At block 320, the processing device transfers the generated file (or data contained therein) to a component of the memory subsystem. For example, the computer system 120 transfers the generated file to the memory subsystem 110, which stores transferred data in the controller memory 119 as the instructions/configuration data 118, which cause the controller 115 (or its components, such as the reclamation manager 113 or the processor 117) to track data validity as described herein. In some embodiments, the processing device transfers the generated file to a memory of the memory subsystem prior to the complete assembly of the memory subsystem.

As the controller 115 moves data within media or as the computer system 120 writes data to media, the controller 115 updates the counters in the validity map. For example, when the controller 115 writes a full block stripe of data to media, controller 115 sets all of the counters associated with that block stripe to reflect that all of the TUs within the block stripe are valid. As data is moved or erased, the controller 115 reads the validity counter associated with the impacted TU(s) from the validity map 116 in the controller memory 119, increments or decrements the counter, and writes the updated counter back to the validity map 116.

Moving data within the media causes the media to become a patchwork of valid and invalid of data. A reclamation process moves the valid data to a new location in memory so that the original location can be erased and made available for writing data. For example, the reclamation manager 113 may process block stripes of data. At a high-level, the reclamation manager 113 identifies one or more "victim" block stripes that include invalid data and a target block stripe that is available for writing. The reclamation manager identifies valid data within the victim block stripe(s) based on the validity map 116 to move the valid data to the target block stripe so the victim block stripes can be erased.

Figure 4:
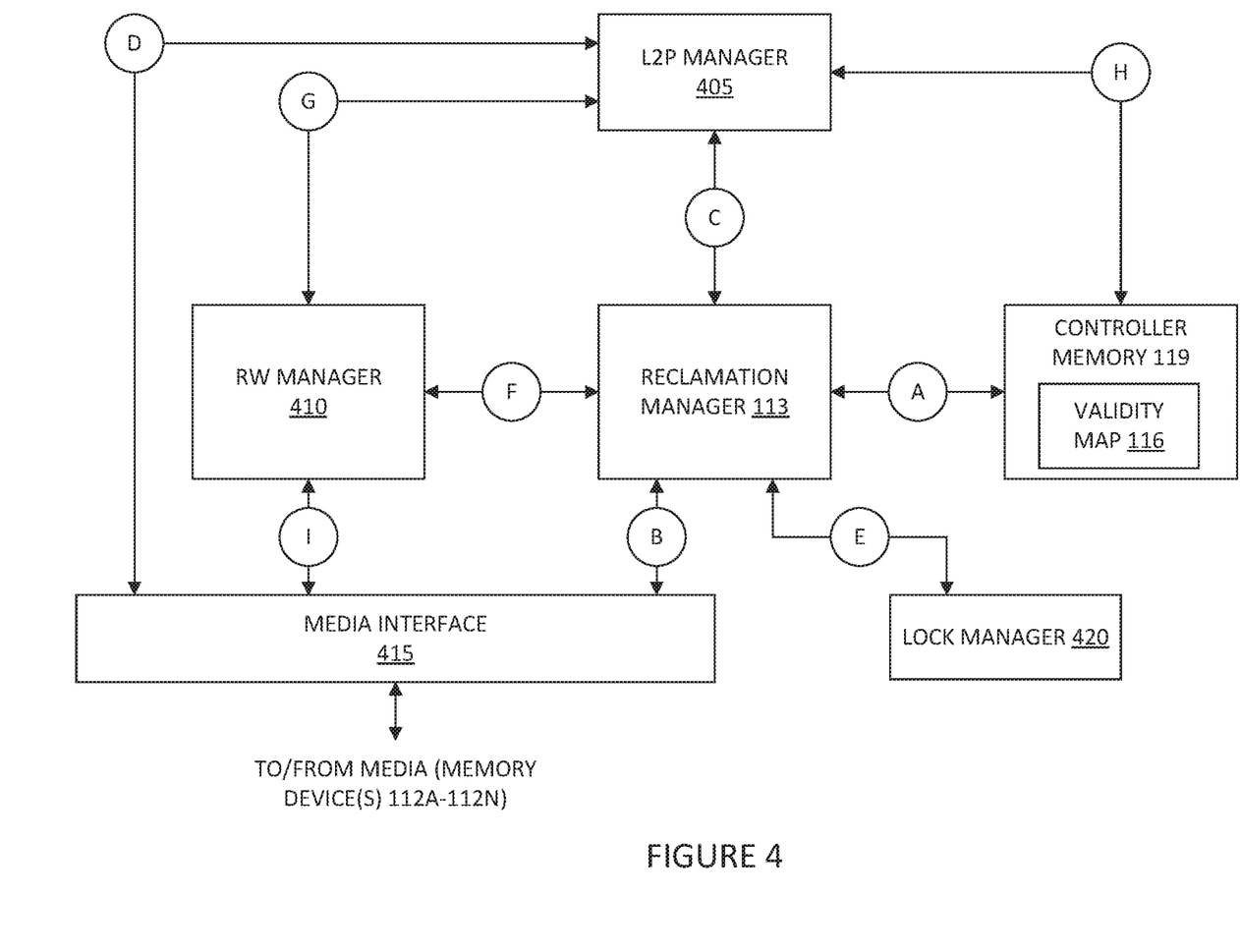
FIG. 4 is an exemplary block diagram of a reclamation process in accordance with some embodiments of the present disclosure.

FIG. 4 is an exemplary block diagram of a reclamation process in accordance with some embodiments of the present disclosure. In such embodiments, the reclamation manager 113 is in communication with or includes one or more other components including a logical-to-physical manager 405, a read-write (RW) manager 410, a media interface 415, and a lock manager 420. Each of these components may be part of the controller 115 (although not specifically illustrated in FIG. 1). The encircled letters "A" through "F" illustrate the overall flow of the reclamation process in this example.

At circle A, the reclamation manager 113 reads the validity map 116 to identify candidate block stripes for reclamation. In some embodiments, the reclamation manager 113 identifies victim block stripe(s) based on the validity counts stored within validity map 116 by, e.g., searching for the block stripe(s) with a count indicating a large number of invalid TUs. Once reclamation manager 113 has identified a victim block stripe, reclamation manager 113 reads the validity count for some number of TUs within the victim block stripe. If the validity count indicates there are no valid TUs within the granularity represented by the validity count, the reclamation manager 113 does not need to move any of the data within that group of TUs. If the validity count indicates one or more valid TUs within the granularity represented by the validity count, the reclamation manager 113 determines which TU(s) within the group of units of data associated with the count contain valid data. If the validity count is at the TU level of granularity and the counter indicates the TU is valid (e.g., a '1'), reclamation manager 113 proceeds to circle E. If the validity count is at a higher level of granularity than the TU, the counter value indicates the total number of TUs that include valid data but does not indicate which TUs include valid data and which TUs do not. In that case, reclamation manager proceeds to circle B.

At circle B, the reclamation manager 113 issues a read to the media interface 415 to read the group of TUs associated with the validity count. For example, if the validity count is at the page level of granularity, the reclamation manager 113 issues a page read to the media interface 415 to read the page. The reclamation manager 113 determines the physical address associated with each TU based on its location within the media. For example, the reclamation manager 113 can determine the physical address of the TU based on its relative location within the block stripe being reclaimed with a known physical address. If a 64-TU block stripe for reclamation is located at a particular address in media, the location of each TU within the block stripe can be determined based on an address offset. For each TU within the group, the reclamation manager 113 extracts the logical address from the associated metadata and performs the operations described below with reference to circles C through I.

At circle C, the reclamation manager 113 requests the physical address associated with the logical address obtained from the TU metadata from the logical-to-physical manager 405. If the logical-to-physical manager 405 has not cached a portion of the logical-to-physical address lookup table that includes the logical address from the TU metadata, the logical-to-physical manager 405 reads the appropriate portion of the logical-to-physical address lookup table via media interface 415, as indicated by circle D. Once the logical-to-physical manager 405 returns the physical address of the TU from the lookup associated with the logical address stored in the TU metadata, the reclamation manager compares that address with the physical address of the TU as determined from its location within the media as read at circle B. Matching physical addresses indicate the TU contains valid data (as the logical address translation is still pointing to the physical address location), while differing physical addresses indicate the TU contains invalid data.

At circle E, when the reclamation manager 113 has identified a valid TU, the reclamation manager 113 requests a lock of the TU from the lock manager 420 to prevent modifications to that TU until the reclamation process completes. At circle F, the reclamation manager 113 sends a command to the RW manager 410 to write (or queue for writing) the TU to the target block stripe. At circle G, the RW manager 410 sends a message to the logical-to-physical manager 405 to update the logical-to-physical address lookup table with the new physical address of the TU within the target block stripe.

At circle H, the logical-to-physical manager 405 reads the valid counts associated with the old TU location (in the victim block stripe) and with the new TU location (in the target block stripe) from the validity map 116 in controller memory 119, decrements the valid count in the former and increments the valid count in the latter, and writes the valid counts back to the validity map 119. In some embodiments, these updates to the validity map may be queued until after the entire group of TUs associated with the read at circle B is complete (and the valid count associated with the new and old locations updated by the number of TUs in the group). At circle I, the RW manager 410 writes the relocated TUs to the target block stripe and lock manager 420 releases the lock on the TU(s).

In the above flow, the reclamation manager 113 need not consult a physical-to-logical address lookup table because the reclamation manager 113 was able to read the TUs associated with the validity count from media (circle B). In some cases, the granularity level may be too coarse (e.g., covering too many TUs) such that a read operation of all of the TUs (to obtain the metadata identifying their associated logical addresses) negatively impacts the performance of the reclamation manager 113. For example, if the validity map tracks validity at the block stripe level of granularity, performing a read of the entire block stripe may significantly impede other media operations (e.g., computer system 120 accesses), etc. As such, in some embodiments employing validity count granularities at a certain level or lower, the physical-to-logical address lookup table may be omitted. In these cases, the controller 115 avoids provisioning space in the media (e.g., memory components 112A to 112N) for the physical-to-logical address lookup table, freeing media resources for other purposes.

Figure 5:
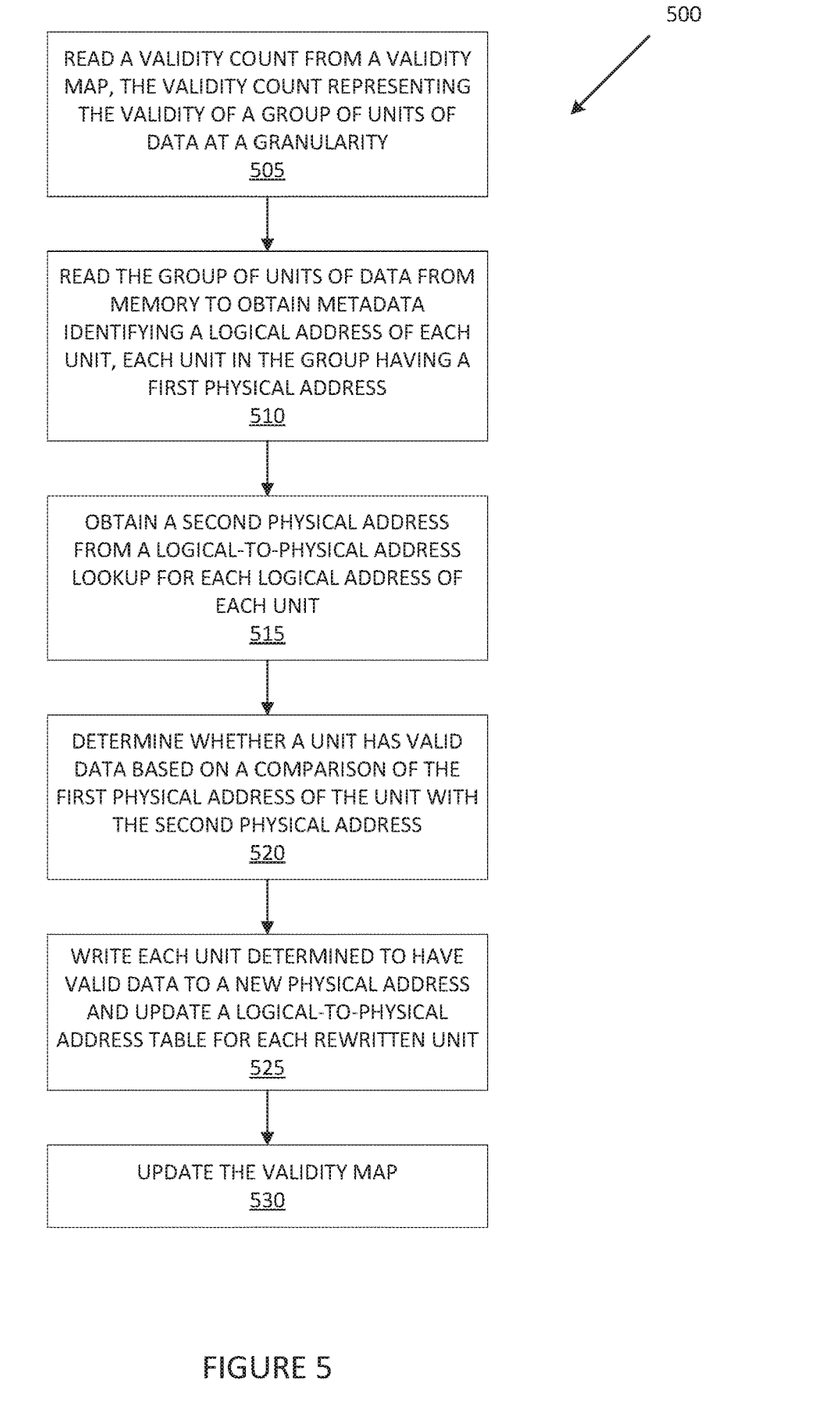
FIG. 5 is a flow diagram of an example method to reclaim unused portions of memory in accordance with some embodiments of the present disclosure.

FIG. 5 is a flow diagram of an example method to reclaim unused portions of memory in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 'Y00 is performed by the reclamation manager component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Having identified one or more folding victims and a folding target, at block 505, the processing device reads a validity count from a validity map associated with one of the victims (e.g., a block stripe). The validity count represents the validity of a group of units of data at a granularity based on the configuration of or the instructions executed by the memory subsystem 110 from the instructions/configuration data 118. For example, if the victim is a block stripe that contains four multiplanes and the validity map granularity is at the multiplane level, the count represents the number of valid TUs within the multiplane.

At block 510, the processing device reads the group of units of data associated with the validity count from media. The read data includes the metadata that identifies the logical address of each unit TU within the group. For example, if the validity count is at the multiplane level, the group includes 16 TUs, each having metadata identifying its corresponding logical address. Note that the processing device can determine the physical address of each TU in the group based on its relative location within the victim block stripe (e.g., based on an offset relative to the block stripe's physical address).

At block 515, the processing device obtains another physical address of the unit of data from a logical-to-physical address lookup. This second physical address is based on a lookup of the logical address stored in the metadata associated with the unit of data in the logical-to-physical address translation table.

At block 520, the processing device determines whether a unit has valid data. To do so, the processing device compares the offset-based physical address of the unit of data (e.g., from the unit of data's position within the victim block stripe) to the logical-to-physical lookup-based physical address (e.g., from the address translation table). Because writes to a logical address are written to a new location in memory (with a corresponding update to the logical-to-physical address translation table) rather than overwriting the existing data in memory, if the offset-based physical address does not match the logical-to-physical lookup-based physical address, the unit of data is no longer valid.

At block 525, the processing device writes each unit determined to have valid data to a new location within the target block stripe and updates a logical-to-physical address table for each rewritten unit by writing the new physical address of the unit within the target block stripe to the corresponding logical address position within the table. Once all of the valid data in the victim block stripe has been moved, the block stripe can be erased.

At block 530, the processing device updates the validity map by incrementing and/or decrementing validity counts associated with the TUs in the victim and target block stripe(s). For example, if the validity map includes counters tracking validity at the multiplane level and relocated four valid TUs from a multiplane in the victim block stripe to a multiplane in the target block stripe, the processing device decrements the counter associated with the multiplane in the victim block stripe and increments the counter associated with the multiplane in the target block stripe. The incrementing or decrementing may occur after each move of the smallest granularity of data (e.g., by −/+1 each time a TU is moved), when all of the units of data within the counter granularity have been moved (e.g., −/+X where X is between 1 and the number of units of data within a counter granularity), or in some other manner. In some embodiments, the processing device moves all valid data within the victim block stripe and resets all of the corresponding validity counters (without decrementing) when the block stripe is erased.

Figure 6:
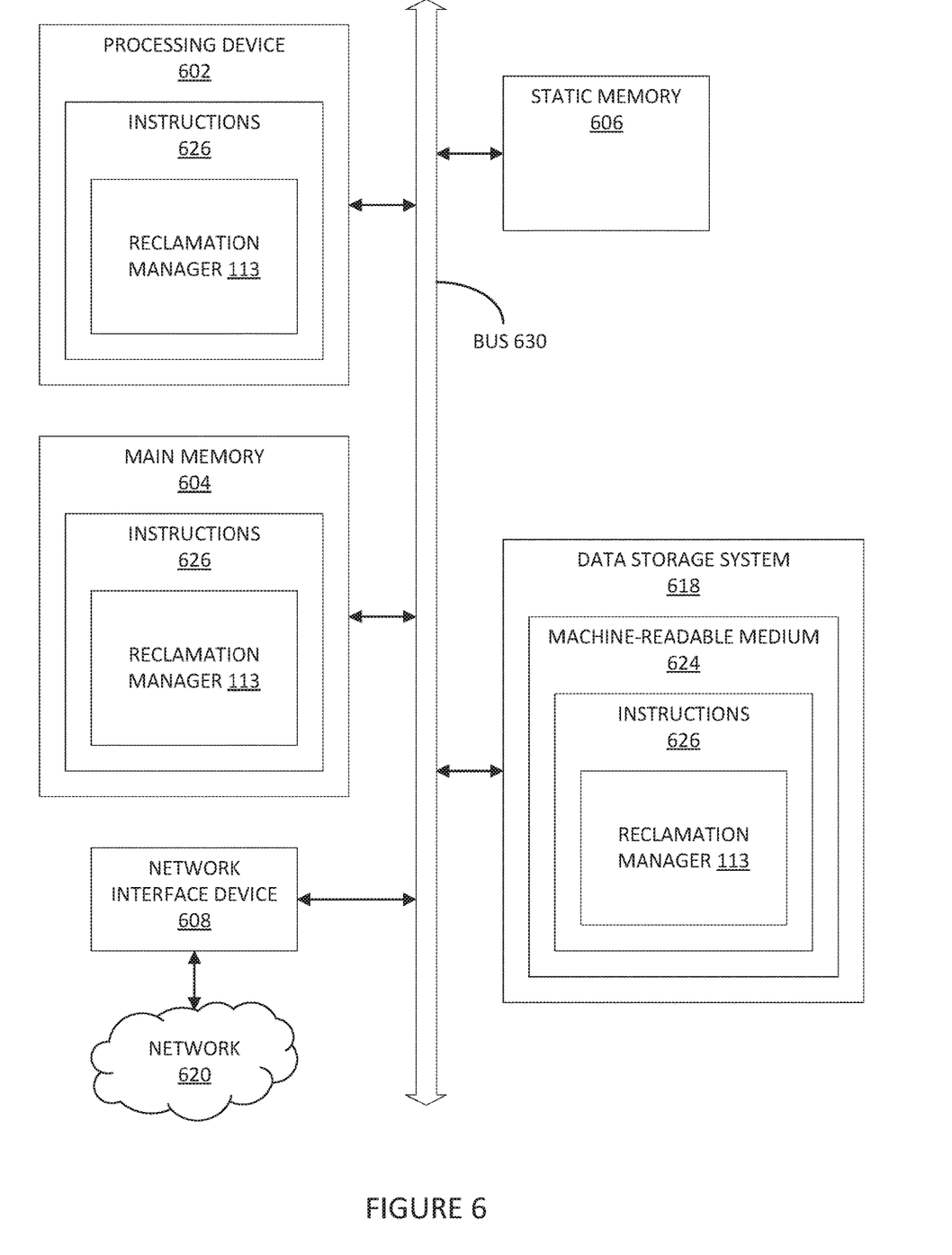
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a computer system (e.g., computer host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the reclamation manager component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory subsystem 110 of FIG. 1.

In one embodiment, the instructions 626 include instructions to implement functionality corresponding to a reclamation manager component (e.g., the reclamation manager component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented method 500 in response to its processor executing a computer program (e.g., a sequence of instructions) contained in a memory or other non-transitory machine-readable storage medium. As another example, a computer system or other data processing system, such as the processor 121, may carry out the computer-implemented method 300 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
reading, by a computer device, an indicator from a configuration file, the indicator identifying a granularity of units of data at which to track validity, wherein the granularity is a group of units of data and the granularity is one of a plurality of granularities ranging from one unit of data in each group to many units of data in each group;
generating, by the computer device based on the indicator in the configuration file, a machine-readable file configured to cause a processing device of a memory system to track validity of one or more units of data within each group at the identified granularity using a plurality of data validity counters, each data validity counter in the plurality of data validity counters tracking validity of each individual unit of data in a corresponding group at the identified granularity, wherein each data validity counter indicates a number of units of data in a corresponding group of units of data that are valid; and
transferring the machine-readable file from the computer device to a memory of the memory system.

2. The method of claim 1, wherein if the granularity identifies a first granularity from the plurality of granularities, the machine-readable file is further configured to cause the processing device to provision space in a non-volatile memory array for a logical-to-physical address translation table and a physical-to-logical address translation table.

3. The method of claim 2, wherein if the granularity identifies a second granularity from the plurality of granularities, the machine-readable file is further configured to cause the processing device to provision space in a non-volatile memory array for a logical-to-physical address translation table and excludes a physical-to-logical address translation table.

4. The method of claim 1, wherein the machine-readable file is further configured to cause the processing device to provision space in a volatile memory for a validity table, the validity table storing a value of each validity counter in the plurality of data validity counters.

5. The method of claim 4, wherein the machine-readable file is further configured to cause the processing device to update a first value of a first validity counter in the validity table when a first unit of data within the group of units of data tracked by the first validity counter is flagged as stale.

6. The method of claim 4, wherein the machine-readable file is further configured to cause the processing device to reclaim a portion of a non-volatile memory array based in part on the validity table.

7. The method of claim 6, wherein to reclaim the portion of the non-volatile memory array comprises:
reading a value of a first validity counter in the plurality of validity counters from the validity table, the first validity counter tracking validity of a first group of units of data at the identified granularity;
if the value of the first validity counter is not equal to zero or to a total number of units of data of the identified granularity:
reading metadata associated with the first group of units of data;
determining a first physical address of a first unit of data within the first group of units of data from a logical-to-physical address lookup based on a logical address of the first unit of data stored within the metadata;
determining a second physical address of the first unit of data within the first group of units of data based on a location of the first unit of data within the first group of units of data; and
if the first physical address matches the second physical address, moving the first unit of data in the non-volatile memory array.

8. A non-transitory computer-readable storage medium comprising instructions that, when executed by a computer device, cause the computer device to:
read an indicator from a configuration file, the indicator identifying a granularity of units of data at which to track validity, wherein the granularity is a group of units of data and the granularity is one of a plurality of granularities ranging from one unit of data in each group to many units of data in each group;
generate, based on the indicator in the configuration file, a machine-readable file configured to cause a processing device of a memory system to track validity of one or more units of data within each group at the identified granularity using a plurality of data validity counters, each data validity counter in the plurality of data validity counters to track validity of each individual unit of data in a corresponding group at the identified granularity, wherein each data validity counter indicates a number of units of data in a corresponding group of units of data that are valid; and
transfer the machine-readable file to a memory of the memory system.

9. The non-transitory computer-readable medium of claim 8, wherein if the granularity identifies a first granularity from the plurality of granularities, the machine-readable file is further configured to cause the processing device to provision space in a non-volatile memory array for a logical-to-physical address translation table and a physical-to-logical address translation table.

10. The non-transitory computer-readable medium of claim 9, wherein if the granularity identifies a second granularity from the plurality of granularities, the machine-readable file is further configured to cause the processing device to provision space in a non-volatile memory array for a logical-to-physical address translation table and excludes a physical-to-logical address translation table.

11. The non-transitory computer-readable medium of claim 8, wherein the machine-readable file is further configured to cause the processing device to provision space in a volatile memory for a validity table, the validity table to store a value of each validity counter in the plurality of data validity counters.

12. The non-transitory computer-readable medium of claim 11, wherein the machine-readable file is further configured to cause the processing device to update a first value of a first validity counter in the validity table when a first unit of data within the group of units of data tracked by the first validity counter is flagged as stale.

13. The non-transitory computer-readable medium of claim 11, wherein the machine-readable file is further configured to cause the processing device to reclaim a portion of a non-volatile memory array based in part on the validity table.

14. The non-transitory computer-readable medium of claim 13, wherein to reclaim a portion of the non-volatile memory array, the processing device is to:

read a value of a first validity counter in the plurality of validity counters from the validity table, the first validity counter to track validity of a first group of units of data at the identified granularity;

if the value of the first validity counter is not equal to zero or to a total number of units of data of the identified granularity:

read metadata associated with the first group of units of data;

determine a first physical address of a first unit of data within the first group of units of data from a logical-to-physical address lookup based on a logical address of the first unit of data stored within the metadata;

determine a second physical address of the first unit of data within the first group of units of data based on a location of the first unit of data within the first group of units of data; and if the first physical address matches the second physical address, move the first unit of data in the non-volatile memory array.

15. A system comprising:

a processing device of a memory subsystem; and a computer device, operatively coupled with the processing device, to:

read an indicator from a configuration file, the indicator identifying a granularity of units of data at which to track validity, wherein the granularity is a group of units of data and the granularity is one of a plurality of granularities ranging from one unit of data in each group to many units of data in each group;

generate, based on the indicator in the configuration file, a machine-readable file configured to cause a processing device of a memory system to track validity of one or more units of data within each group at the identified granularity using a plurality of data validity counters, each data validity counter in the plurality of data validity counters to track validity of each individual unit of data in a corresponding group at the identified granularity, wherein each data validity counter indicates a number of units of data in a corresponding group of units of data that are valid; and transfer the machine-readable file to a memory of the memory system.

16. The system of claim 15, wherein if the granularity identifies a first granularity from the plurality of granularities, the machine-readable file is further configured to cause the processing device to provision space in a non-volatile memory array for a logical-to-physical address translation table and a physical-to-logical address translation table.

17. The system of claim 16, wherein if the granularity identifies a second granularity from the plurality of granularities, the machine-readable file is further configured to cause the processing device to provision space in a non-volatile memory array for a logical-to-physical address translation table and excludes a physical-to-logical address translation table.

18. The system of claim 15, wherein the machine-readable file is further configured to cause the processing device to provision space in a volatile memory for a validity table, the validity table to store a value of each validity counter in the plurality of data validity counters.

19. The system of claim 18, wherein the machine-readable file is further configured to cause the processing device to update a first value of a first validity counter in the validity table when a first unit of data within the group of units of data tracked by the first validity counter is flagged as stale.

20. The system of claim 18, wherein the machine-readable file is further configured to cause the processing device to reclaim a portion of a non-volatile memory array based in part on the validity table.

* * * * *

UNITED STATES PATENT AND TRADEMARK OFFICE
CERTIFICATE OF CORRECTION

PATENT NO. : 10,795,828 B2
APPLICATION NO. : 16/101288
DATED : October 6, 2020
INVENTOR(S) : Boon Leong Yeap et al.

It is certified that error appears in the above-identified patent and that said Letters Patent is hereby corrected as shown below:

In the Specification

In Column 1, Lines 55-56, delete "tracking data validity tracking", and insert --data validity tracking--.

In Column 8, Line 12, delete "method 'Y00", and insert --method 300--.

In Column 11, Line 24, delete "method 'Y00", and insert --method 500--.

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*